US012696904B1

(12) United States Patent
Darrag et al.

(10) Patent No.: US 12,696,904 B1
(45) Date of Patent: Aug. 4, 2026

(54) **BIOPESTICIDE FORMULATION INCLUDING *PLICOSEPALUS ACACIAE*, *OCIMUM BASILICUM*, AND *EUCALYPTUS TERETICORNIS* EXTRACTS**

(71) Applicant: KING FAISAL UNIVERSITY, Hofouf (SA)

(72) Inventors: Hossam Moustafa Salem Darrag, Hofouf (SA); Anwar Ali Aldhafeeri, Hofouf (SA); Shamseddin Musa Ahmed Hassan, Hofouf (SA); Mohammad Ali Mohammad Albloushi, Hofouf (SA)

(73) Assignee: KING FAISAL UNIVERSITY, Hofouf (SA)

( * ) Notice: Subject to any disclaimer, the term of this patent is extended or adjusted under 35 U.S.C. 154(b) by 0 days.

(21) Appl. No.: 19/368,090

(22) Filed: Oct. 24, 2025

(51) Int. Cl.
| | |
|---|---|
| *A61K 36/00* | (2006.01) |
| *A01N 25/04* | (2006.01) |
| *A01N 65/08* | (2009.01) |
| *A01N 65/22* | (2009.01) |
| *A01N 65/28* | (2009.01) |
| *A01P 7/04* | (2006.01) |

(52) U.S. Cl.
CPC ............. *A01N 65/28* (2013.01); *A01N 25/04* (2013.01); *A01N 65/08* (2013.01); *A01N 65/22* (2013.01); *A01P 7/04* (2021.08)

(58) Field of Classification Search
CPC ........................................................ A01P 7/04
See application file for complete search history.

(56) References Cited

U.S. PATENT DOCUMENTS

2012/0128648 A1    5/2012  Kaushik

FOREIGN PATENT DOCUMENTS

| IN | 1193/DEL/2004 | 6/2006 |
|---|---|---|
| IN | 277/DEL/2008 | 8/2009 |
| IN | 202311085860 | 1/2024 |
| IN | 202441099010 | 12/2024 |
| IN | 202541054864 | 6/2025 |

OTHER PUBLICATIONS

Darrag, H. M., et al., "Exploring Ocimum basilicum's Secondary Metabolites: Inhibition and Molecular Docking against Rhynchophorus ferrugineus for Optimal Action," Plants 2024, 13, 491.

Darrag, H. M. et al., "Analysis of Volatile Secondary Metabolites in Ocimum basilicum Cell Suspensions: Inhibition, In Silico Molecular Docking, and an ADMET Analysis against Proteolytic Enzymes of Rhynchophorus ferrugineus," Plants 2022, 11(21), 2949.

Darrag, H. M., et al., "Secondary Metabolites in Basil, Bio-Insecticide, Inhibition Effect, and In Silico Molecular Docking against Proteolytic Enzymes of the Red Palm Weevil (*Rhynchophorus ferrugineus*)," Plants 2022, 11, 1087.

Darrag, H. M. et al., "Bio-Insecticide of Thymus vulgaris and Ocimum basilicum Extract from Cell Suspensions and Their Inhibitory Effect against Serine, Cysteine, and Metalloproteinases of the Red Palm Weevil (*Rhynchophorus ferrugineus*)," Insects 2021, 12(5), 405.

Baeshen, R. S. and Mohamed M. B., "Efficacy of Acacia nilotica, Eucalyptus camaldulensis, and Salix safsafs on the mortality and development of two vector-borne mosquito species, Culex pipiens and Aedes aegypti, in the laboratory and field." Heliyon 9 e16378 (2023).

*Primary Examiner* — Qiuwen Mi

(74) *Attorney, Agent, or Firm* — Nath, Goldberg & Meyer; Joshua B. Goldberg

(57) ABSTRACT

A biopesticide formulation is provided, including extracts of *Plicosepalus acacia*, *Ocimum basilicum*, and *Eucalyptus tereticornis*. The biopesticide formulation may include a 3:4:4 ratio of *Plicosepalus acaciae:Ocimum basilicum:Eucalyptus tereticornis*. The biopesticide formulation may be formulated as a nano-emulsion and may have an $LD_{50}$ of 4.57 μg/larva and a $LC_{50}$ of 247 μg/mL against *Rhynchophorus ferrugineus*. The biopesticide formulation may be made by a method including extracting *Plicosepalus acaciae* powder, *Eucalyptus tereticornis* callus, and *Ocimum basilicum* callus using methanol, drying the extracts, and mixing the dried extracts. The biopesticide formulation may then be formulated as a nano-emulsion by vigorous mixing with a surfactant and a co-surfactant.

19 Claims, 1 Drawing Sheet

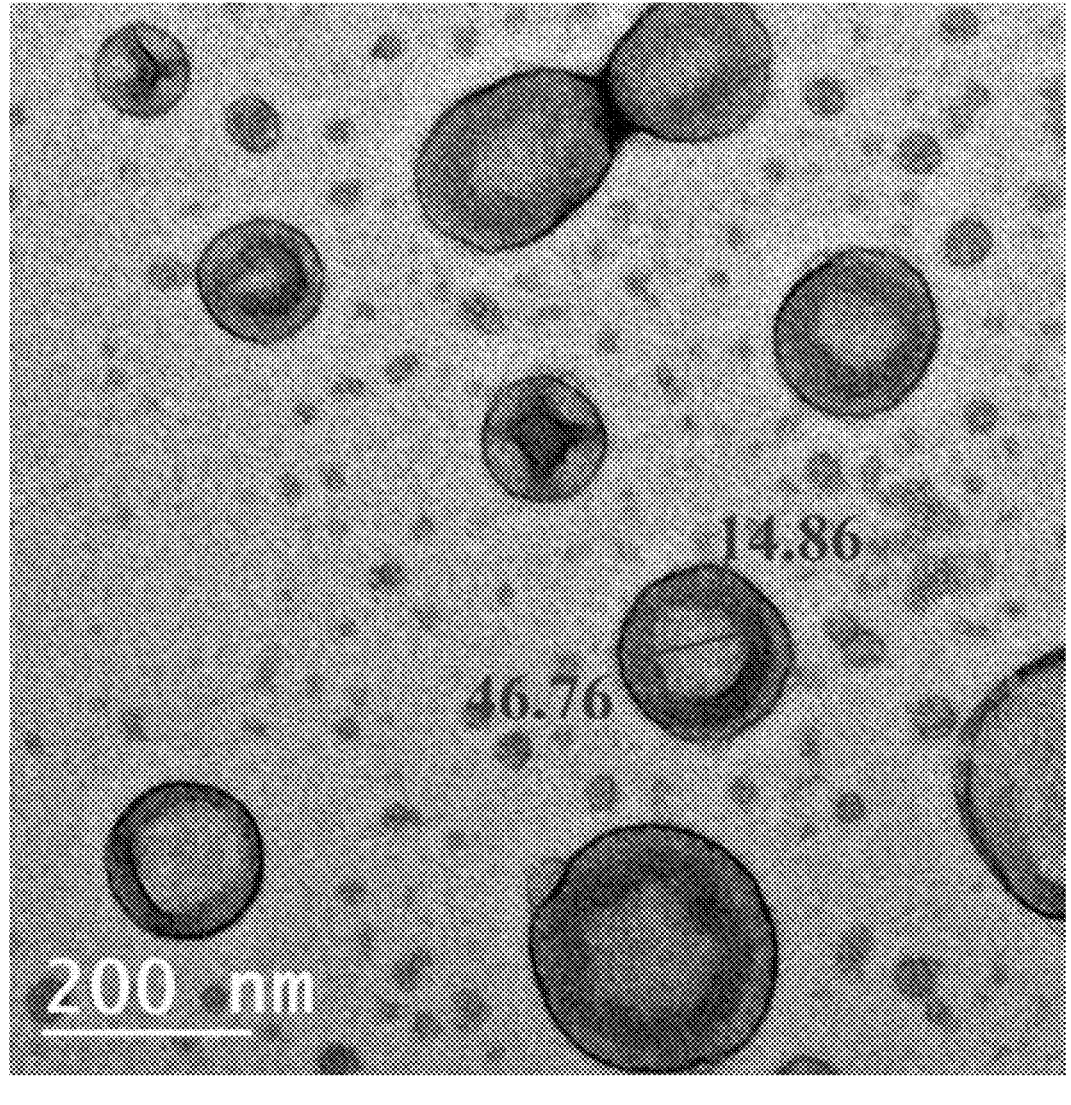

BIOPESTICIDE FORMULATION INCLUDING *PLICOSEPALUS ACACIAE*, *OCIMUM BASILICUM*, AND *EUCALYPTUS TERETICORNIS* EXTRACTS

FIELD AND BACKGROUND OF THE INVENTION

The disclosure of the present patent application relates to pesticides and, particularly, to a biopesticide formulated with *Plicosepalus acaciae, Ocimum basilicum*, and *Eucalyptus tereticornis* extracts.

DESCRIPTION OF THE PRIOR ART

*Plicosepalus acaciae* (*P. acaciae*) is a parasitic plant, also known as the Acacia Strap Flower or as the Acacia mistletoe, that infects tamarisk and acacia trees. *P. acaciae* is a woody shrub that is hemiparasitic. It belongs to the subclass Rosidae and the order Santalales, which includes the Viscaceae and Lorantheaceae families. *P. acaciae* is a kind of mistletoe that is commonly found throughout Alula, Saudi Arabia.

*Ocimum basilicum* (*O. basilicum*) and other members of the Lamiaceae family have been grown for a long time throughout the world for its many desirable qualities. *O. basilicum* is known to produce secondary metabolites including phenols, polyphenols, terpenoids, and flavonoids. These secondary metabolites are known to have antibacterial, antioxidant, anti-inflammatory, and bio-insecticidal effects.

*Eucalyptus tereticornis* (*E. tereticornis*), also known as *Eucalyptus*, or as Forest Red Gum or Blue Gum, is a fast-growing tree native to Saudi Arabia. *E. tereticornis* commonly grows to 50 meters or more, and its smooth, shedding bark reveals a gray, white, or blue-grey surface. The *Eucalyptus* tree has lanceolate, glossy green leaves and clusters of white to cream-colored blooms following woody seed capsules. Strong wood makes *E. tereticornis* very important for flooring, furniture-making, and building construction. Planting *E. tereticornis* for afforestation, carbon sequestration, and erosion control is also a common approach to environmental protection. *E. tereticornis* also plays a role in the manufacture of honey, due to its nectar-rich blooms, and its leaves have long been used medicinally, mainly for respiratory ailments and as antiseptics. *E. tereticornis* grows well in well-drained conditions and is adaptable enough to grow in different types of soil. It is also tolerant of salt and dryness. *E. tereticornis* has shown potential in pest control due in great part to its natural bioactive chemicals-especially essential oils rich in eucalyptol (1,8-cineole), terpenes, and phenolic compounds. These molecules have antifungal, insecticidal, and repellent properties. Research on extractions from its leaves and bark has tested their efficacy against agricultural pests like aphids, whiteflies, and stored-product insects including beetles and moths. *E. tereticornis* derived essential oil has been found to help repel mosquitoes and certain insect vectors and has been proposed for use in public health campaigns against diseases like malaria and dengue. Moreover, *E. tereticornis* leaf extracts have been shown to have antibacterial effects against plant diseases, and to limit the spread of bacterial and fungal infections in crops.

However, designing cell and tissue culture protocols for synthesizing plant secondary metabolites at scale has proven challenging, due at least in part to poor efficiency and poor productivity.

Thus, a biopesticide formulation including *Plicosepalus acaciae, Ocimum basilicum*, and *Eucalyptus tereticornis* extracts solving the aforementioned problems is desired.

SUMMARY OF THE INVENTION

The present subject matter relates to an environmentally friendly biopesticide prepared from extracts of *Plicosepalus acaciae* (Acacia Strap Flower), *Ocimum basilicum* (Basil), and *Eucalyptus tereticornis* (*Eucalyptus*) designed particularly to combat the Red Palm Weevil (*Rhynchophorus ferrugineus*). The present biopesticides may have an $LD_{50}$ of about 4.57 µg/larva and an $LC_{50}$ of about 247 µg/mL against *R. ferrugineus*. The present biopesticides may act by essentially blocking critical metabolic enzymes vital for insect life, such as acetylcholinesterase, phosphatases, gamma-aminobutyric acid transaminase, total protease, trypsin-like serine proteinases, elastase, cysteine, and metallo-protease.

In an embodiment, biopesticides according to the present subject matter may be made by extracting plant components via Soxhlet extraction, tissue culture, and somatic embryogenesis, and surfactants such as polysorbate 80 and glycerol may be used to create nano-emulsions, improving stability and bioavailability of the active agents obtained from the plant extracts. The nano-emulsion technique provides improved insecticidal effectiveness and long-term stability.

In addition to controlling pests, the present biopesticides may be useful for promoting environmental sustainability. The present biopesticides are plant-based formulations, and thus offer a feasible, affordable, and scalable substitute for synthetic pesticides. The present biopesticides may be used to augment integrated pest management (IPM) plans for preservation of palm farms.

In an embodiment, biopesticides according to the present subject matter may possess the bioactive qualities of *Plicosepalus acaciae* (Acacia Strap Flower), *Ocimum basilicum* (Basil), and *Eucalyptus tereticornis* (*Eucalyptus*), including the phenolic-rich antibacterial and antioxidant compounds of Basil grown in Al-Hasa, the antimicrobial and insecticidal effects of the Acacia Strap Flower, and the essential oils of *Eucalyptus* (which contribute repellent and antifungal action).

In some embodiments, the biopesticide formulation may include a mixture of a dried extract of *Plicosepalus acaciae*; a dried extract of *Ocimum basilicum*; and a dried extract of *Eucalyptus tereticornis*. The biopesticide formulation may include a 3:4:4 ratio of the *P. acaciae* dried extract, the *O. basilicum* dried extract, and the *E. tereticornis* dried extract. The biopesticide formulation may further be formulated as a nano-emulsion by including glycerol and polysorbate 80 in the mixture. The biopesticide formulations may have an $LD_{50}$ of 4.57 µg/larva and a $LC_{50}$ of 247 µg/mL against *Rhynchophorus ferrugineus*.

In some embodiments, the biopesticide formulation may be made by a method including: providing *P. acaciae* leaves; drying the *P. acacia* leaves to obtain dried *P. acacia* leaves; grinding the dried *P. acacia* leaves to obtain *P. acacia* powder; extracting the *P. acacia* powder using methanol to obtain a first *P. acacia* extract; concentrating first *P. acacia* extract to obtain a second *P. acacia* extract; providing *E. tereticornis* seeds; delinting, sterilizing, and germinating the *E. tereticornis* seeds; cutting leaf segments from the germinated *E. tereticornis*; growing the *E. tereticornis* leaf segments with a growth medium to obtain *E. tereticornis* callus; extracting the *E. tereticornis* callus with methanol to obtain an *E. tereticornis* extract; providing *O. basilicum* seeds; delinting, sterilizing, and germinating the *O. basilicum* seeds; cutting leaf segments from the germinated *O. basilicum*; growing the *O. basilicum* leaf segments with a growth medium to obtain *O. basilicum* callus; extracting the *O. basilicum* callus with methanol to obtain an *O. basilicum* extract; drying the second *P. acacia* extract, the *E. tereticornis* extract, and the *O. basilicum* extract; and mixing the dried *P. acacia* extract, the dried *E. tereticornis* extract, and the dried *O. basilicum* extract to obtain the biopesticide formulation. In some embodiments, these methods may include mixing the biopesticide formulation with a surfactant and a co-surfactant to obtain a first mixture; vortexing the first mixture; adding deionized water to the first mixture to obtain a second mixture; and sonicating the second mixture to obtain a nano-emulsion comprising the biopesticide formulation.

The methods of making the present biopesticide formulations may include drying *P. acacia* leaves by a method selected from the group consisting of sun drying, oven drying, and air drying. The present methods may include grinding the *P. acaciae* leaves using a mortar and pestle. The present methods may include concentrating the first *P. acacia* extract at about 30° C. to about 45° C. using a rotary evaporator.

The methods of making the present biopesticide formulations may include growing the *E. tereticornis* leaf segments on Murashige and Skoog medium. The Murashige and Skoog medium may include about 3% sucrose and about 6.0 g/L of agar. In some embodiments, the Murashige and Skoog medium may further include about 0.5 mg/L 2,4-D, about 0.5 mg/L kinetin, about 0.5 mg/L Naphthaleneacetic Acid, and about 1 mg/L Indole-3-Butyric Acid. In other embodiments, the Murashige and Skoog medium may include about 100 mM of methyl jasmonate, about 0.3 mg/L kinetin, about 0.5 mg/L 2,4-D, about 0.2 mg/L Naphthaleneacetic Acid, and about 1 mg/L Indole-3-Butyric Acid, and *Verticillium dahliae*.

The methods of making the present biopesticide formulations may include growing the *O. basilicum* leaf segments on Murashige and Skoog medium. The Murashige and Skoog medium may include about 3% sucrose and about 6.0 g/L of agar. In some embodiments, the Murashige and Skoog medium may include about 0.5 mg/L 2,4-D, about 0.5 mg/L kinetin, about 0.5 mg/L Naphthaleneacetic Acid, and about 1 mg/L Indole-3-Butyric Acid. In other embodiments, the Murashige and Skoog medium comprises about 100 mM of methyl jasmonate, about 0.3 mg/L kinetin, about 0.5 mg/L 2,4-D, about 0.2 mg/L Naphthaleneacetic Acid, and about 1 mg/L Indole-3-Butyric Acid, and *Verticillium dahliae*.

The methods of making the present biopesticide formulations may include growing the *O. basilicum* leaf segments on Linsmaier and Skoog medium and/or growing the *E. tereticornis* leaf segments on Linsmaier and Skoog medium.

Methods are also provided of inhibiting or killing *Rhynchophorus ferrugineus*, including administering one of the present biopesticide formulations to a plant in need thereof. In some embodiments, the present biopesticide formulations are administered to a date palm plant for inhibiting or killing *Rhynchophorus ferrugineus* in the date palm plant.

These and other features of the present subject matter will become readily apparent upon further review of the following specification.

BRIEF DESCRIPTION OF DRAWINGS

FIG. 1 depicts a photomicrograph illustrating the size of nano-emulsions prepared according to the present subject matter and analyzed by a droplet size analyzer.

Similar reference characters denote corresponding features consistently throughout the attached drawings.

DETAILED DESCRIPTION

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to an environmentally friendly biopesticide prepared from extracts of *Plicosepalus acaciae* (Acacia Strap Flower), *Ocimum basilicum* (Basil), and *Eucalyptus tereticornis* (*Eucalyptus*). The present biopesticides are particularly effective for combatting the Red Palm Weevil (*Rhynchophorus ferrugineus*). The present biopesticides may have an $LD_{50}$ of about 4.57 µg/larva and an $LC_{50}$ of about 247 µg/mL against *R. ferrugineus*. The present biopesticides may act by essentially blocking critical metabolic enzymes vital for insect life, such as acetylcholinesterase, phosphatases, gamma-aminobutyric acid transaminase, total protease, trypsin-like serine proteinases, elastase, cysteine, and metallo-protease.

In an embodiment, biopesticides according to the present subject matter may be made by extracting plant components via Soxhlet extraction, tissue culture, and somatic embryogenesis, combining the extracted plant components to provide a mixture, and adding surfactants such as polysorbate 80 and glycerol to the mixture to create nano-emulsions, and improve stability and bioavailability of the active agents obtained from the plant extracts. The nano-emulsion technique provides improved insecticidal effectiveness and long-term stability.

In addition to controlling pests, the present biopesticides may be useful for promoting environmental sustainability. The present biopesticides are plant-based formulations, and thus offer a feasible, affordable, and scalable substitute for synthetic pesticides. The present biopesticides may be used to augment integrated pest management (IPM) plans for preservation of palm farms.

In an embodiment, biopesticides according to the present subject matter may exhibit the bioactive qualities of *Plicosepalus acaciae* (Acacia Strap Flower), *Ocimum basilicum* (Basil), and *Eucalyptus tereticornis* (*Eucalyptus*), including the phenolic-rich antibacterial and antioxidant effects of Basil grown in Al-Hasa, the antimicrobial and insecticidal effects of the Acacia Strap Flower, and the repellent and antifungal action of essential oils of *Eucalyptus*.

In some embodiments, the biopesticide formulation may include a dried extract of *Plicosepalus acaciae*; a dried extract of *Ocimum basilicum*; and a dried extract of *Eucalyptus tereticornis*. The biopesticide formulation may include a 3:4:4 ratio of the *P. acaciae* dried extract, the *O. basilicum* dried extract, and the *E. tereticornis* dried extract. The biopesticide formulation may further be formulated as a nano-emulsion by including glycerol and polysorbate 80. The biopesticide formulations may have an $LD_{50}$ of 4.57 g/larva and a $LC_{50}$ of 247 µg/mL against *Rhynchophorus ferrugineus*.

In some embodiments, the biopesticide formulation may be made by a method including: providing *P. acaciae* leaves; drying the *P. acacia* leaves to obtain dried *P. acacia* leaves; grinding the dried *P. acacia* leaves to obtain *P. acacia* powder; extracting the *P. acacia* powder using methanol to obtain a first *P. acacia* extract; concentrating first *P. acacia* extract to obtain a second *P. acacia* extract; providing *E. tereticornis* seeds; delinting, sterilizing, and germinating the *E. tereticornis* seeds; cutting leaf segments from the germinated *E. tereticornis*; growing the *E. tereticornis* leaf segments with a growth medium to obtain *E. tereticornis* callus; extracting the *E. tereticornis* callus with methanol to obtain an *E. tereticornis* extract; providing *O. basilicum* seeds; delinting, sterilizing, and germinating the *O. basilicum* seeds; cutting leaf segments from the germinated *O. basilicum*; growing the *O. basilicum* leaf segments with a growth medium to obtain *O. basilicum* callus; extracting the *O. basilicum* callus with methanol to obtain an *O. basilicum* extract; drying the second *P. acacia* extract, the *E. tereticornis* extract, and the *O. basilicum* extract; and mixing the dried *P. acacia* extract, the dried *E. tereticornis* extract, and the dried *O. basilicum* extract to obtain the biopesticide formulation. In some embodiments, these methods may further include mixing the biopesticide formulation with a surfactant and a co-surfactant to obtain a first mixture; vortexing the first mixture; adding deionized water to the first mixture to obtain a second mixture; and sonicating the second mixture to obtain a nano-emulsion comprising the biopesticide formulation.

The methods of making the present biopesticide formulations may include drying *P. acacia* leaves by a method selected from the group consisting of sun drying, oven drying, and air drying. The present methods may include grinding the *P. acaciae* leaves using a mortar and pestle. The present methods may include concentrating the first *P. acacia* extract at about 30° C. to about 45° C. using a rotary evaporator.

The methods of making the present biopesticide formulations may include growing the *E. tereticornis* leaf segments on Murashige and Skoog medium. The Murashige and Skoog medium may include about 3% sucrose and about 6.0 g/L of agar. In some embodiments, the Murashige and Skoog medium may further include about 0.5 mg/L 2,4-D, about 0.5 mg/L kinetin, about 0.5 mg/L Naphthaleneacetic Acid, and about 1 mg/L Indole-3-Butyric Acid. In other embodiments, the Murashige and Skoog medium may include about 100 mM of methyl jasmonate, about 0.3 mg/L kinetin, about 0.5 mg/L 2,4-D, about 0.2 mg/L Naphthaleneacetic Acid, and about 1 mg/L Indole-3-Butyric Acid, and *Verticillium dahliae*.

The methods of making the present biopesticide formulations may include growing the *O. basilicum* leaf segments on Murashige and Skoog medium. The Murashige and Skoog medium may include about 3% sucrose and about 6.0 g/L of agar. In some embodiments, the Murashige and Skoog medium may include about 0.5 mg/L 2,4-D, about 0.5 mg/L kinetin, about 0.5 mg/L Naphthaleneacetic Acid, and about 1 mg/L Indole-3-Butyric Acid. In other embodiments, the Murashige and Skoog medium comprises about 100 mM of methyl jasmonate, about 0.3 mg/L kinetin, about 0.5 mg/L 2,4-D, about 0.2 mg/L Naphthaleneacetic Acid, and about 1 mg/L Indole-3-Butyric Acid, and *Verticillium dahliae.*

The methods of making the present biopesticide formulations may include growing the *O. basilicum* leaf segments on Linsmaier and Skoog medium and/or growing the *E. tereticornis* leaf segments on Linsmaier and Skoog medium.

Methods are also provided of inhibiting or killing *Rhynchophorus ferrugineus*, including administering an embodiment of the present biopesticide formulations to a plant in need thereof. In some embodiments, the plant in need of inhibiting or killing *Rhynchophorus ferrugineus* may be a date palm.

The present biopesticide formulation can include secondary metabolites derived from the mistletoe extract, *Eucalyptus*, and Hasawan basil cell suspension extract. Somatic embryonic technologies generate the extract of Mistletoe leaves as well as cell suspension of *Eucalyptus* (*Eucalyptus tereticornis*) and basil Al-Hasa (*Ocimum basilicum*). By means of this approach, active compounds may be produced for biopesticide applications, thus aiding eco-friendly, environmentally friendly, cost-effective manufacturing of environmental sustainable nanoemulsions (Nano-Es).

The present biopesticide, derived from *Plicosepalus acaciae* (Acacia Strap Flower), *Ocimum basilicum* (basil), and *Eucalyptus tereticornis* (*eucalyptus*), is an efficient, environmentally friendly substitute for pest management, particularly against Red Palm Weevil (*Rhynchophorus ferrugineus*). Strong insecticidal action, enzyme inhibition, and bioactive qualities of the secondary metabolites found in these plant extracts validate their use in integrated pest management (IPM). Demonstrating physicochemical stability, the nano-emulsion formulation (Nano-Es) guarantees effective distribution and continuous effectiveness. The use of cell suspensions and somatic embryogenesis offers a scalable and environmentally friendly means of manufacturing the present biopesticide.

The present biopesticide purposefully combines three botanical sources: *Plicosepalus acaciae* (Acacia Strap Flower), *Ocimum basilicum* (basil), and *Eucalyptus tereticornis* (*eucalyptus*), each of which have distinct modes of action and bioactive compounds. The targeted combination in the nano-emulsified formula exhibits synergistic effects or demonstrably greater efficacy and technical advantages over the individual components used therein.

Laboratory and field studies confirm that when combined, the extracts produce significantly higher insecticidal activity against Red Palm Weevil (*Rhynchophorus ferrugineus*) than the individual extracts or binary mixtures. Specifically, the biopesticide mixture (ratio 3:4:4) achieves $LD_{50}$ of 4.57 µg/larva and $LC_{50}$ of 247 µg/mL, compared to lesser efficacy observed with single-source or dual-source biopesticides of *Eucalyptus* or basil.

The present biopesticide not only increases insect mortality but simultaneously inhibits multiple critical pest enzymes (acetylcholinesterase, acid phosphatase, alkaline phosphatase, GABA transaminase, and a suite of proteases), thus blocking several metabolic pathways vital for pest survival. This multipronged effect is not achieved by prior art formulas based only on *Eucalyptus* or similar single-source extracts.

When formulated as a nano-emulsion including Polysorbate 80 and glycerol, the present biopesticide confers stable droplet size, favorable zeta potential, and enhanced bioavailability, allowing sustained efficacy and better leaf coverage under field and storage conditions. The use of advanced tissue culture and somatic embryogenesis enables scalable production of active compounds, an approach not disclosed previously, increasing both yield and consistency of secondary metabolite profiles. Our physicochemical tests confirm the superior stability and no phase separation during extended shelf-life compared to conventional extracts.

The use of extracts of the *Plicosepalus acaciae* plants (Acacia Strap Flower or Mistletoe) may provide distinct antimicrobial and insecticidal compounds not previously blended in biopesticide nano-emulsions.

The use of extracts of *Ocimum basilicum* plants (basil) may provide high-yield secondary metabolites (including phenolics and flavonoids). The yield of *Ocimum basilicum* secondary metabolites may be particularly improved through cell suspension and somatic embryogenesis. This method may yield up to 8×-10× higher active compound concentrations than typical plant tissue extraction methods that do not include the use of cell suspension and somatic embryogenesis.

The use of extracts of *Eucalyptus tereticornis* may provide a particularly high eucalyptol content (when compared to other *Eucalyptus*) and a robust antifungal and insecticidal activity. This unique combination may be ascribed to *Eucalyptus tereticornis*' environmental adaptations (including salt/drought resistance and sustainability).

Liquid chromatography-mass spectrometry (LC-MS) and gas chromatography-mass spectrometry (GC-MS) analyses revealed the present biopesticide formulation contains higher concentrations and a broader spectrum of phenolics, flavonoids, terpenes, and alkaloids than standard *Eucalyptus*-based biopesticides. These include caffeic acid derivatives, salvianolic acids, rosmarinic acid, nepetoidin constituents, and mono-terpene hydrocarbons, which are synergistic in pest inhibition and not previously disclosed in a single pesticide composition.

The method of making the present biopesticide utilizes cell suspensions and somatic embryogenesis for both *Ocimum basilicum* and *Eucalyptus tereticornis*. *Plicosepalus acaciae* is extracted separately. In combination, these steps achieve secondary metabolite yields up to 8×-10× higher than previously reported when extracting natural plant tissue and ensures uniformity, scalability, and industrial compatibility.

The present biopesticide not only offers superior pest control but also provides phyto-enhancement, soil health benefits, and biodegradability. Our assessment shows zero phytotoxicity in target crops and confirms that the present biopesticide contributes to integrated pest management (IPM), further advancing sustainability compared to single-target chemical or plant-based biopesticides.

Tables 1-6 document the detailed metabolite profiles, including phenolics, terpenoids, and flavonoid glycosides, which contribute to multi-target inhibition of the present biopesticide.

TABLE 1

LC-MS Data for *Plicosepalus acaciae* Extract

| # | Tentative Compounds | RT (min) | Formula | [M-H]– (m/z) | Fragmentation ions (m/z) |
|---|---|---|---|---|---|
| 1 | Malic acid | 1.08 | C4H6O5 | 133.01 | 133, 115, 87, 71 |
| 2 | Succinic acid | 1.92 | C4H6O4 | 117.02 | 117, 99, 73 |
| 3 | Quinic acid | 2.70 | C7H12O6 | 191.05 | 191, 173, 127, 111 |
| 4 | Caffeoylquinic acid | 4.81 | C16H18O9 | 353.09 | 353, 191, 179, 161, 135 |
| 5 | Chlorogenic acid | 5.02 | C16H18O9 | 353.09 | 353, 191, 179 |
| 6 | Ferulic acid | 6.15 | C10H10O4 | 193.05 | 193, 178, 149 |
| 7 | p-Coumaric acid | 6.85 | C9H8O3 | 163.04 | 163, 119, 93 |
| 8 | 3,5-Dicaffeoylquinic acid | 8.91 | C25H24O12 | 515.12 | 353, 191, 179, 161 |
| 9 | Scopoletin | 9.35 | C10H8O4 | 191.05 | 191, 163, 133 |
| 10 | Kaempferol | 10.98 | C15H10O6 | 285.04 | 285, 257, 229 |
| 11 | Luteolin | 11.22 | C15H10O6 | 285.04 | 285, 241, 175 |
| 12 | Quercetin | 11.79 | C15H10O7 | 301.04 | 301, 271, 179 |
| 13 | Isoquercitrin | 12.15 | C21H20O12 | 463.08 | 301, 300, 271 |
| 14 | Rutin | 12.43 | C27H30O16 | 609.15 | 301, 271, 179, 151 |
| 15 | Diosmetin | 13.12 | C16H12O6 | 299.06 | 284, 255, 151 |
| 16 | Apigenin | 13.74 | C15H10O5 | 269.05 | 269, 225, 151 |
| 17 | Cyanidin 3-glucoside | 14.50 | C21H21O11 | 449.11 | 287, 285, 151 |
| 18 | Cyanogenic glycoside (linamarin) | 15.28 | C10H17NO6 | 247.10 | 185, 145, 119 |
| 19 | Vicenin-2 (apigenin di-C-glucoside) | 16.34 | C27H30O15 | 593.15 | 431, 313, 271, 151 |
| 20 | Stigmasterol | 17.81 | C29H48O | 411.38 | 396, 369, 255 |
| 21 | β-Sitosterol | 18.09 | C29H50O | 415.39 | 397, 381, 255 |
| 22 | Squalene | 18.53 | C30H50 | 410.39 | 395, 369, 273 |
| 23 | Phytol | 19.47 | C20H40O | 297.36 | 279, 165, 135 |
| 24 | Linoleic acid | 19.82 | C18H32O2 | 279.23 | 261, 245, 173, 131 |
| 25 | Solavetivone | 20.23 | C15H22O | 217.17 | 202, 189, 161, 133 |
| 26 | 9-Octadecenamide | 20.79 | C18H35NO | 282.28 | 264, 253, 212 |
| 27 | α-Tocopherol | 21.91 | C29H50O2 | 431.38 | 416, 389, 165, 135 |
| 28 | Zeaxanthin | 22.74 | C40H56O2 | 568.43 | 550, 536, 459, 429 |

TABLE 2

GC-MS Data for *Plicosepalus acaciae* Extract

| # | Compound | RT (min) | Formula | Main Ion (m/z) | Class |
|---|---|---|---|---|---|
| 1 | α-pinene | 5.3 | C10H16 | 136 | Monoterpene Hydrocarbon |
| 2 | camphene | 6.7 | C10H16 | 136 | Monoterpene Hydrocarbon |
| 3 | β-pinene | 7.2 | C10H16 | 136 | Monoterpene Hydrocarbon |
| 4 | limonene | 8.5 | C10H16 | 136 | Monoterpene Hydrocarbon |
| 5 | sabinene | 8.9 | C10H16 | 136 | Monoterpene Hydrocarbon |
| 6 | 1,8-cineole | 10.1 | C10H18O | 154 | Oxygenated Monoterpene |
| 7 | linalool | 11.3 | C10H18O | 154 | Oxygenated Monoterpene |
| 8 | camphor | 12.4 | C10H16O | 152 | Oxygenated Monoterpene |
| 9 | geraniol | 13.1 | C10H18O | 154 | Oxygenated Monoterpene |
| 10 | α-copaene | 14.7 | C15H24 | 204 | Sesquiterpene Hydrocarbon |
| 11 | β-caryophyllene | 15.8 | C15H24 | 204 | Sesquiterpene Hydrocarbon |
| 12 | α-humulene | 17.2 | C15H24 | 204 | Sesquiterpene Hydrocarbon |
| 13 | germacrene D | 18.3 | C15H24 | 204 | Sesquiterpene Hydrocarbon |
| 14 | δ-cadinene | 19.4 | C15H24 | 204 | Sesquiterpene Hydrocarbon |
| 15 | τ-cadinol | 20.6 | C15H26O | 220 | Oxygenated Sesquiterpene |
| 16 | α-eudesmol | 21.1 | C15H26O | 220 | Oxygenated Sesquiterpene |
| 17 | linoleic acid | 23.3 | C18H32O2 | 280 | Fatty Acid |
| 18 | palmitic acid | 24.0 | C16H32O2 | 256 | Fatty Acid |
| 19 | stearic acid | 25.1 | C18H36O2 | 284 | Fatty Acid |
| 20 | methyl linoleate | 26.5 | C19H34O2 | 294 | Fatty Acid Ester |
| 21 | ethyl palmitate | 27.3 | C18H36O2 | 284 | Fatty Acid Ester |
| 22 | ethyl isovalerate | 28.0 | C7H14O2 | 130 | Non-Terpene Derivative |
| 23 | chavicol | 29.2 | C10H10O | 148 | Phenylpropanoid |
| 24 | eugenol | 30.4 | C10H12O2 | 164 | Phenylpropanoid |
| 25 | methyl eugenol | 31.6 | C11H14O2 | 178 | Phenylpropanoid |
| 26 | β-sitosterol | 32.8 | C29H50O | 414 | Sterol |
| 27 | stigmasterol | 34.2 | C29H48O | 412 | Sterol |
| 28 | squalene | 35.7 | C30H50 | 410 | Triterpene Hydrocarbon |
| 29 | α-tocopherol | 37.1 | C29H50O2 | 430 | Vitamin |
| 30 | 6-methyl-5-hepten-2-one | 38.5 | C8H14O | 126 | Non-Terpene Derivative |

TABLE 3

LC-MS Metabolite Profile in *Ocimum basilicum* Cell Suspensions

| No. | Detected Compound | Retention Time (min) | Formula | Main Ion (m/z) | Noted Fragment Ions (m/z) |
|---|---|---|---|---|---|
| 1 | Tartaric acid | 1.02 | $C_4H_5O_6$ | 149.00 | 149, 141, 131, 113, 103, 87 |
| 2 | Isocitric acid | 2.53 | $C_6H_7O_7$ | 191.02 | 191, 173, 129, 111 |
| 3 | Caffeic acid derivative | 4.11 | $C_{18}H_{32}O_4Si_3$ | 359.70 | 396, 381, 359, 219, 191, 75 |
| 4 | Caftaric acid | 5.62 | $C_{13}H_{12}O_9$ | 311.04 | 311, 179, 149, 135 |
| 5 | Caffeic acid | 6.25 | $C_9H_8O_4$ | 179.03 | 179, 135 |
| 6 | Fertaric acid | 6.30 | $C_{14}H_{14}O_9$ | 325.06 | 325, 193, 134 |
| 7 | Salvianolic acid H/I | 6.36 | $C_{27}H_{22}O_{12}$ | 537.10 | 537, 493, 339, 313, 295, 197, 179 |
| 8 | Salvianolic acid K | 9.55 | $C_{27}H_{24}O_{13}$ | 555.11 | 555, 537, 493, 295 |
| 9 | Chicoric acid | 11.16 | $C_{22}H_{18}O_{12}$ | 473.07 | 473, 311, 293, 179, 149 |
| 10 | Lithospermic acid | 11.29 | $C_{27}H_{22}O_{12}$ | 537.10 | 537, 493, 356, 295 |
| 11 | Dihydroquercetin 3-glucoside | 11.45 | $C_{21}H_{22}O_{12}$ | 456.10 | 467, 465, 313, 285, 259, 456, 175, 151 |
| 12 | Quercetin-3-O-rutino-side | 11.50 | $C_{27}H_{30}O_{16}$ | 611.16 | 611, 465, 449, 303 |
| 13 | Rosmarinic acid | 11.58 | $C_{18}H_{16}O_8$ | 359.08 | 359, 197, 179, 161, 135, 117 |
| 14 | Salvianolic acid E | 12.67 | $C_{36}H_{30}O_{16}$ | 717.15 | 717, 519, 475, 339 |
| 15 | Salvianolic acid A | 12.48 | $C_{26}H_{22}O_{10}$ | 493.11 | 493, 313, 295, 185 |
| 16 | Salvianolic acid B | 12.59 | $C_{36}H_{30}O_{16}$ | 717.15 | 717, 519, 321 |
| 17 | Salvianolic acid F | 17.91 | $C_{17}H_{14}O_6$ | 313.07 | 313, 269 |
| 18 | Cyanidin 3,3'-diglucoside | 18.13 | $C_{27}H_{31}O_{16}$ | 611.16 | 611, 287 |
| 19 | Cyanidin 3-O-rutinoside | 18.26 | $C_{27}H_{31}O_{15}$ | 595.17 | 595, 287 |
| 20 | Salvigenin | 18.26 | $C_{18}H_{16}O_6$ | 327.21 | 327, 311, 277, 215, 205, 117 |
| 21 | Naringenin 7-O-glucoside | 18.35 | $C_{21}H_{22}O_{10}$ | 434.40 | 435, 271, 151, 119 |
| 22 | Apigenin 7-O-glucoside | 18.43 | $C_{21}H_{20}O_{10}$ | 432.40 | 432, 271, 171, 147, 119 |
| 23 | Rosmarinic acid gluco-side A | 21.35 | $C_{24}H_{26}O_{13}$ | 521.12 | 359, 197, 179, 161, 135 |
| 24 | Rosmarinic acid gluco-side B | 25.12 | $C_{24}H_{26}O_{13}$ | 521.12 | 359, 323, 197, 179, 161, 135 |
| 25 | Nepetoidin A | 25.51 | $C_{17}H_{14}O_6$ | 314.29 | 335, 313, 161, 133 |
| 26 | Nepetoidin B | 25.64 | $C_{17}H_{14}O_6$ | 314.29 | 335, 313, 269, 161, 133 |
| 27 | Ursolic acid | 26.03 | $C_{30}H_{48}O_3$ | 456.70 | 591, 524, 523, 459, 455 |
| 28 | Nepetoidin glucoside | 27.93 | $C_{23}H_{24}O_{11}$ | 475.12 | 475, 323, 313, 161, 151 |

TABLE 4

GC-MS Data for *Ocimum basilicum* Cell Suspension Extract

| # | Compound | RT (min) | Formula | Main Ion (m/z) | Class |
|---|---|---|---|---|---|
| 1 | α-thujene | 5.2 | C10H16 | 136 | Monoterpene Hydrocarbon |
| 2 | α-pinene | 5.8 | C10H16 | 136 | Monoterpene Hydrocarbon |
| 3 | camphene | 6.4 | C10H16 | 136 | Monoterpene Hydrocarbon |
| 4 | sabinene | 7.1 | C10H16 | 136 | Monoterpene Hydrocarbon |
| 5 | β-pinene | 7.6 | C10H16 | 136 | Monoterpene Hydrocarbon |
| 6 | β-myrcene | 8.2 | C10H16 | 136 | Monoterpene Hydrocarbon |
| 7 | α-phellandrene | 8.8 | C10H16 | 136 | Monoterpene Hydrocarbon |
| 8 | car-4-ene | 9.4 | C10H16 | 136 | Monoterpene Hydrocarbon |
| 9 | α-terpinene | 10.0 | C10H16 | 136 | Monoterpene Hydrocarbon |
| 10 | limonene | 10.8 | C10H16 | 136 | Monoterpene Hydrocarbon |
| 11 | (Z)-β-ocimene | 11.4 | C10H16 | 136 | Monoterpene Hydrocarbon |
| 12 | (E)-β-ocimene | 12.1 | C10H16 | 136 | Monoterpene Hydrocarbon |
| 13 | γ-terpinene | 12.6 | C10H16 | 136 | Monoterpene Hydrocarbon |
| 14 | terpinolene | 13.3 | C10H16 | 136 | Monoterpene Hydrocarbon |
| 15 | 1,8-cineole | 7.5 | C10H18O | 154 | Oxygenated Monoterpene |
| 16 | linalool | 10.3 | C10H18O | 154 | Oxygenated Monoterpene |
| 17 | β-terpineol | 13.6 | C10H18O | 154 | Oxygenated Monoterpene |
| 18 | camphor | 10.8 | C10H16O | 152 | Oxygenated Monoterpene |
| 19 | borneol | 12.2 | C10H18O | 154 | Oxygenated Monoterpene |
| 20 | terpinen-4-ol | 13.8 | C10H18O | 154 | Oxygenated Monoterpene |
| 21 | α-terpineol | 14.4 | C10H18O | 154 | Oxygenated Monoterpene |
| 22 | estragole | 16.1 | C10H12O | 148 | Oxygenated Monoterpene |
| 23 | fenchyl acetate | 16.8 | C12H20O2 | 196 | Oxygenated Monoterpene |
| 24 | nerol | 18.4 | C10H18O | 154 | Oxygenated Monoterpene |
| 25 | neral | 19.1 | C10H16O | 152 | Oxygenated Monoterpene |
| 26 | p-mentha-1,8-dien-7-ol | 19.9 | C10H16O | 152 | Oxygenated Monoterpene |
| 27 | bornyl acetate | 20.6 | C12H20O2 | 196 | Oxygenated Monoterpene |
| 28 | methyl geranate | 21.2 | C11H18O3 | 198 | Oxygenated Monoterpene |

TABLE 4-continued

GC-MS Data for *Ocimum basilicum* Cell Suspension Extract

| # | Compound | RT (min) | Formula | Main Ion (m/z) | Class |
|---|----------|----------|---------|----------------|-------|
| 29 | neryl acetate | 21.9 | C12H20O2 | 196 | Oxygenated Monoterpene |
| 30 | a-copaene | 22.5 | C15H24 | 204 | Sesquiterpene Hydrocarbon |
| 31 | (E)-β-bourbonene | 23.2 | C15H24 | 204 | Sesquiterpene Hydrocarbon |
| 32 | α-cubebene | 23.7 | C15H24 | 204 | Sesquiterpene Hydrocarbon |
| 33 | β-cubebene | 24.3 | C15H24 | 204 | Sesquiterpene Hydrocarbon |
| 34 | β-elemene | 25.0 | C15H24 | 204 | Sesquiterpene Hydrocarbon |
| 35 | 7-epi-sesquithujene | 25.8 | C15H24 | 204 | Sesquiterpene Hydrocarbon |
| 36 | α-gurjunene | 26.4 | C15H24 | 204 | Sesquiterpene Hydrocarbon |
| 37 | β-caryophyllene | 27.1 | C15H24 | 204 | Sesquiterpene Hydrocarbon |
| 38 | β-copaene | 27.6 | C15H24 | 204 | Sesquiterpene Hydrocarbon |
| 39 | β-gurjunene (calarene) | 28.2 | C15H24 | 204 | Sesquiterpene Hydrocarbon |
| 40 | trans-α-bergamotene | 28.7 | C15H24 | 204 | Sesquiterpene Hydrocarbon |
| 41 | α-guaiene | 29.1 | C15H24 | 204 | Sesquiterpene Hydrocarbon |
| 42 | β-bergamotene | 29.7 | C15H24 | 204 | Sesquiterpene Hydrocarbon |
| 43 | α-humulene | 30.4 | C15H24 | 204 | Sesquiterpene Hydrocarbon |
| 44 | (E)-β-farnesene | 30.9 | C15H24 | 204 | Sesquiterpene Hydrocarbon |
| 45 | cis-muurola-4(14),5-diene | 31.5 | C15H24 | 204 | Sesquiterpene Hydrocarbon |
| 46 | γ-muurolene | 32.2 | C15H24 | 204 | Sesquiterpene Hydrocarbon |
| 47 | germacrene D | 32.9 | C15H24 | 204 | Sesquiterpene Hydrocarbon |
| 48 | β-selinene | 33.5 | C15H24 | 204 | Sesquiterpene Hydrocarbon |
| 49 | β-bulnesene | 34.0 | C15H24 | 204 | Sesquiterpene Hydrocarbon |
| 50 | β-bisabolene | 34.7 | C15H24 | 204 | Sesquiterpene Hydrocarbon |
| 51 | γ-cadinene | 35.3 | C15H24 | 204 | Sesquiterpene Hydrocarbon |
| 52 | β-sesquiphellandrene | 35.8 | C15H24 | 204 | Sesquiterpene Hydrocarbon |
| 53 | δ-cadinene | 36.4 | C15H24 | 204 | Sesquiterpene Hydrocarbon |
| 54 | α-cadinene | 36.9 | C15H24 | 204 | Sesquiterpene Hydrocarbon |
| 55 | τ-cadinol | 37.4 | C15H26O | 220 | Oxygenated Sesquiterpene |
| 56 | α-eudesmol | 38.1 | C15H26O | 220 | Oxygenated Sesquiterpene |
| 57 | α-Bisabolene oxide | 38.6 | C15H24O | 220 | Oxygenated Sesquiterpene |
| 58 | chavicol | 9.6 | C10H10O | 146 | Phenylpropanoid |
| 59 | eugenol | 13.5 | C10H12O2 | 164 | Phenylpropanoid |
| 60 | methyl eugenol | 15.5 | C11H14O2 | 178 | Phenylpropanoid |
| 61 | ethyl isovalerate | 5.1 | C7H14O2 | 130 | Non-Terpene Derivative |
| 62 | 6-methyl-5-hepten-2-one | 6.2 | C8H14O | 126 | Non-Terpene Derivative |

TABLE 5

LC-MS Chemical Composition of *Eucalyptus tereticornis* Cell Suspensions

| No. | Tentative Compound | RT (min) | Formula | [M-H]- (m/z) | Fragmentation Ions (m/z) |
|-----|-------------------|----------|---------|--------------|--------------------------|
| 1 | Gallic acid | 2.07 | C7H6O5 | 169.01 | 169, 151, 125, 97 |
| 2 | Ellagic acid | 4.35 | C14H6O8 | 301.01 | 301, 257, 229, 185, 157 |
| 3 | Phloroglucinol | 5.92 | C6H6O3 | 125.02 | 125, 97, 69 |
| 4 | Macrocarpal A | 9.84 | C30H48O6 | 504.34 | 504, 475, 457, 427 |
| 5 | Sideroxylonal A | 10.12 | C24H22O8 | 437.11 | 437, 419, 381, 353 |
| 6 | Euglobal IA | 10.63 | C28H38O8 | 503.26 | 503, 439, 375, 295 |
| 7 | Eucalyptin | 11.04 | C15H10O6 | 285.04 | 285, 257, 229, 201 |
| 8 | 1,8-Cineole | 11.49 | C10H18O | 154.14 | 154, 136, 108 |
| 9 | α-Phellandrene | 11.91 | C10H16 | 136.13 | 136, 121, 93 |
| 10 | Aromadendrene | 12.03 | C15H24 | 204.19 | 204, 189, 161 |
| 11 | β-Eudesmol | 12.22 | C15H26O | 222.20 | 222, 204, 189, 161 |
| 12 | Globulol | 13.06 | C15H26O | 222.20 | 222, 204, 189, 161 |
| 13 | Viridiflorol | 13.74 | C15H26O | 222.20 | 222, 189, 161, 123 |
| 14 | Quercetin | 15.18 | C15H12O8 | 301.03 | 301, 273, 257, 151 |
| 15 | Chlorogenic acid | 15.92 | C16H18O9 | 353.05 | 353, 191, 179, 135 |
| 16 | Betulinic acid | 16.83 | C30H48O3 | 456.36 | 456, 438, 410, 392 |
| 17 | Ursolic acid | 17.20 | C30H48O3 | 456.36 | 456, 438, 410, 392 |
| 18 | Oleanolic acid | 17.43 | C30H48O3 | 456.36 | 456, 438, 410, 392 |
| 19 | Eugenol | 18.02 | C10H12O2 | 163.09 | 163, 151, 135, 107 |
| 20 | Citriodorol | 18.92 | C10H20O | 156.16 | 156, 138, 120 |
| 21 | Rutin | 19.54 | C27H30O16 | 609.15 | 609, 301, 179, 151 |
| 22 | Pinocarvone | 20.03 | C10H14O | 150.10 | 150, 132, 104 |
| 23 | Camphor | 20.48 | C10H16O | 152.13 | 152, 134, 106 |

TABLE 6

| # | Compound | RT (min) | Formula | Main Ion (m/z) | Class |
|---|---|---|---|---|---|
| 1 | α-Pinene | 5.2 | C10H16 | 136 | Monoterpene Hydrocarbon |
| 2 | β-Pinene | 5.9 | C10H16 | 136 | Monoterpene Hydrocarbon |
| 3 | Sabinene | 6.5 | C10H16 | 136 | Monoterpene Hydrocarbon |
| 4 | Myrcene | 7.3 | C10H16 | 136 | Monoterpene Hydrocarbon |
| 5 | Limonene | 8.2 | C10H16 | 136 | Monoterpene Hydrocarbon |
| 6 | 1,8-Cineole | 8.8 | C10H18O | 154 | Oxygenated Monoterpene |
| 7 | α-Terpineol | 9.4 | C10H18O | 154 | Oxygenated Monoterpene |
| 8 | Terpinolene | 10.1 | C10H16 | 136 | Monoterpene Hydrocarbon |
| 9 | Borneol | 10.9 | C10H18O | 154 | Oxygenated Monoterpene |
| 10 | Camphor | 11.5 | C10H16O | 152 | Oxygenated Monoterpene |
| 11 | Globulol | 13.3 | C15H26O | 222 | Oxygenated Sesquiterpene |
| 12 | Aromadendrene | 14.1 | C15H24 | 204 | Sesquiterpene Hydrocarbon |
| 13 | Viridiflorol | 15.7 | C15H26O | 222 | Oxygenated Sesquiterpene |
| 14 | β-Caryophyllene | 16.4 | C15H24 | 204 | Sesquiterpene Hydrocarbon |
| 15 | Terpinen-4-ol | 17.2 | C10H18O | 154 | Oxygenated Monoterpene |
| 16 | Neral | 18.0 | C10H16O | 152 | Oxygenated Monoterpene |
| 17 | Geranyl acetate | 18.8 | C12H20O2 | 196 | Oxygenated Monoterpene |
| 18 | α-Eudesmol | 19.6 | C15H26O | 222 | Oxygenated Sesquiterpene |
| 19 | β-Eudesmol | 20.4 | C15H26O | 222 | Oxygenated Sesquiterpene |
| 20 | Longifolene | 21.2 | C15H24 | 204 | Sesquiterpene Hydrocarbon |
| 21 | Spathulenol | 22.1 | C15H24O | 220 | Oxygenated Sesquiterpene |
| 22 | Allo-aromadendrene | 22.9 | C15H24 | 204 | Sesquiterpene Hydrocarbon |
| 23 | Caryophyllene oxide | 23.7 | C15H24O | 220 | Oxygenated Sesquiterpene |
| 24 | α-Terpinen | 24.5 | C10H16 | 136 | Monoterpene Hydrocarbon |
| 25 | α-Copaene | 25.3 | C15H24 | 204 | Sesquiterpene Hydrocarbon |
| 26 | Camphene | 26.0 | C10H16 | 136 | Monoterpene Hydrocarbon |
| 27 | γ-Terpinene | 26.8 | C10H16 | 136 | Monoterpene Hydrocarbon |
| 28 | Pulegone | 27.5 | C10H16O | 152 | Oxygenated Monoterpene |
| 29 | Citronellal | 28.3 | C10H18O | 154 | Oxygenated Monoterpene |
| 30 | β-Selinene | 29.0 | C15H24 | 204 | Sesquiterpene Hydrocarbon |
| 31 | α-Humulene | 30.1 | C15H24 | 204 | Sesquiterpene Hydrocarbon |
| 32 | Pinocarvone | 31.0 | C10H14O | 150 | Oxygenated Monoterpene |
| 33 | Pinocarveol | 31.7 | C10H16O | 152 | Oxygenated Monoterpene |
| 34 | p-Cymene | 32.5 | C10H14 | 134 | Monoterpene Hydrocarbon |
| 35 | α-Phellandrene | 33.2 | C10H16 | 136 | Monoterpene Hydrocarbon |
| 36 | Trans-pinocarveol | 33.9 | C10H16O | 152 | Oxygenated Monoterpene |
| 37 | Eucalyptol | 34.6 | C10H18O | 154 | Oxygenated Monoterpene |
| 38 | Phloroglucinol derivatives | 35.3 | C6H6O3 | 126 | Polyphenolic Compound |
| 39 | Macrocarpal D | 36.1 | C30H44O4 | 468 | Phenolic Dimer |
| 40 | Sideroxylonal C | 36.8 | C27H34O7 | 470 | Phloroglucinol |
| 41 | Eucalyptin | 37.6 | C20H18O10 | 418 | Coumarin Derivative |
| 42 | Grandinal | 38.2 | C22H26O6 | 386 | Phloroglucinol Derivative |
| 43 | Gallic acid | 38.9 | C7H6O5 | 170 | Phenolic Acid |
| 44 | Ellagic acid | 39.7 | C14H6O8 | 302 | Polyphenolic Compound |
| 45 | Quercetin | 40.3 | C15H12O7 | 302 | Flavonoid |
| 46 | Protocatechuic acid | 41.0 | C7H6O4 | 154 | Phenolic Acid |
| 47 | Citriodorol | 41.8 | C10H18O | 154 | Oxygenated Monoterpene |
| 48 | Chlorogenic acid | 42.5 | C16H18O9 | 354 | Phenolic Acid |
| 49 | Ferulic acid | 43.2 | C10H10O4 | 194 | Phenolic Acid |
| 50 | Rutin | 44.0 | C27H30O16 | 610 | Flavonoid Glycoside |

The physicochemical stability of the present biopesticide was confirmed by droplet analyzer and zeta potential measurements (data not shown).

Synergistic effects in biopesticides occur when a combination of plant extracts produces a pest control efficacy greater than the sum of their individual effects. Synergy may result from the interaction of multiple active compounds, often through complementary or overlapping mechanisms (such as multi-enzyme inhibition, multiple metabolic targets, or increased bioavailability). With respect to the present biopesticide, multi-enzyme inhibition could result from the ability of the combined extracts to block acetylcholinesterase, GABA transaminase, and diverse proteases, thereby disrupting multiple insect life processes and making resistance less likely. Activity against multiple metabolic targets could result from the complementary phytochemicals, including antimicrobial and insecticidal compounds, derived from *Plicosepalus acaciae*, the phenolic antioxidants derived from *Ocimum basilicum*, and the terpenoid-rich oils derived from *Eucalyptus tereticornis*. This combination could provide a wider spectrum of action and, thereby, reduce the required dose. Finally, the biopesticide's nano-emulsion formulation improves compound penetration and stability, further amplifying the biological effect relative to the individual components.

An example of the synergistic effect achieved by the present nano-emulsion biopesticide is shown in Table 7:

TABLE 7

Comparative Pest Mortality and Persistence

| Treatment | Pest Mortality (24 h, %) | Persistence (days) |
|---|---|---|
| *Acacia nilotica* extract (solo) | 92-100 | 8 |
| *Eucalyptus* extract (solo) | 77-95 | 7 |

TABLE 7-continued

| Comparative Pest Mortality and Persistence | | |
|---|---|---|
| Treatment | Pest Mortality (24 h, %) | Persistence (days) |
| *Ocimum basilicum* extract (solo) | 65-80 | 7 |
| Combination Nano-emulsion | 100 | 12 |

The present nano-emulsion biopesticide demonstrates synergistic effects at least in its toxicity against Red Palm Weevil (*Rhynchophorus ferrugineus*), measured as $LD_{50}$ (lethal dose for 50% mortality) and $LC_{50}$ (lethal concentration for 50% mortality). The present nano-emulsion biopesticide may have an $LD_{50}$=4.57 µg/larva (very low dose, high potency) and a $LC_{50}$=247 µg/mL. In comparison, the individual extracts require much higher concentrations to achieve the same effect (see Table 8).

TABLE 8

| Comparative Toxicity against Red Palm Weevil | | | | | |
|---|---|---|---|---|---|
| Component | $LD_{50}$ (µg/larva) | $LC_{50}$ (µg/mL) | AChE $IC_{50}$ (µg/mL) | ALP $IC_{50}$ | ACP $IC_{50}$ |
| *Plicosepalus acaciae* | 9-12 | >800 | >500 | >500 | >500 |
| *Ocimum basilicum* | 7-10 | >900 | >350 | >400 | >400 |
| *Eucalyptus tereticornis* | 8-13 | >780 | >410 | >380 | >430 |
| Nano-Es Biopesticide | 4.57 | 247 | 114.8 | 132.7 | 142.5 |

The present nano-emulsion biopesticide showed more potent inhibition of key insect metabolic enzymes than single extracts, consistent with a multi-target mode of action. Quantitatively, the nano-emulsion biopesticide achieved $LD_{50}$=4.57 µg/larva and $LC_{50}$=247 µg/mL against *Rhynchophorus ferrugineus* and inhibited AChE ($IC_{50}$=114.8 g/mL), ALP (132.7 µg/mL), and ACP (142.5 µg/mL). In comparison, the activities of the individual extracts were dramatically reduced from those found for the combined nano-emulsion biopesticide (see Table 8). In proteolytic pathways, $IC_{50}$ values were 108.3 µg/mL (total protease), 81.2 µg/mL (trypsin-like serine proteinases), 96.7 µg/mL (elastase), 65.9 g/mL (cysteine protease), and 46.8 µg/mL (metalloprotease).

The present biopesticide may be useful for pre- and post-infestation management of palm weevils and other pests for date palms and other palm species, horticultural and field crops susceptible to borer, beetle, or weevil attacks. In addition, the present biopesticide may be useful in treating various other agricultural pests due to its demonstrated multi-enzyme inhibition and broad-spectrum phytochemical profile.

The present nano-emulsion biopesticide may be particularly useful for achieving improved leaf/wound coverage and penetration, enhanced physical stability (including resistance to phase separation and environmental degradation), and providing prolonged residual activity for enhanced pest management.

In an embodiment, the present nano-emulsion biopesticide may be formulated for use as foliar spray, surface drench, trunk injection, or for any other agricultural delivery modes now known or developed in the future.

The present teachings may be better understood in view of the following examples:

Example 1

Obtaining Secondary Metabolites

*P. acaciae* leaves were dried by the sun, an oven, or ambient air, and each group of *P. acaciae* were finely ground using a mortar and pestle. About 5 g of the dried, ground *P. acaciae* material was extracted using methanol and a Soxhlet apparatus to obtain about 50 mL of *P. acaciae* extract. Under lowered pressure (typically 150 to 250 mbar, equivalent to 75-90% vacuum), the *P. acaciae* extracts were concentrated at about 30° C. to about 45° C. using a rotary evaporator. The pressure range was selected to ensure gentle solvent removal without thermal degradation of phenolic and flavonoid constituents. The concentrated *P. acaciae* extracts were refrigerated at about –4° C. in sample vials and labeled for further study.

*E. tereticornis* and *O. basilicum* were delinted, sterilized, and then germinated on sterile blotting paper in Petri plates. After three to five days, leaf segments 1 cm×1 cm from each of *E. tereticornis* and *O. basilicum* were placed on MS (Murashige and Skoog) medium. MS medium including about 3% sucrose and about 6.0 g/L of agar was the most successful for producing callus in *E. tereticornis* and *O. basilicum* when the solid medium was supplemented with plant growth regulators (PGRs) at doses of about 0.5 mg/L 2,4-D, kinetin and NAA (Naphthaleneacetic Acid) and about 1 mg/L IBA (Indole-3-Butyric Acid). In a further test case, medium was supplemented with about 100 mM of methyl jasmonate, about 0.3 mg/L kinetin, about 0.5 mg/L 2,4-D, about 0.2 mg/L NAA, and about 1 mg/L IBA and including the abiotic activator *Verticillium dahliae*.

Spectroscopic techniques (LC/MS-MS) were used to investigate the chemical compositions of cell suspension extracts from each plant species. Cell suspensions were started on LS media (Linsmaier and Skoog), a liquid media, and grown for a period of about 40 to about 45 days. The greatest callus was obtained during a 35-40 day development period, which caused a gradual rise in mean cell weight, total phenolics, flavonoids, and condensed tannins. Following agitation for 12 hours and methanol extraction at a cell:methanol ratio of 1:9, the cell suspensions were dried using anhydrous $Na_2SO_4$ to produce a product suitable for pest control treatment. The dried cell suspensions were subjected to the spectroscopic analysis.

To produce an ecofriendly biopesticide treatment product, a combination of the dried methanol extracts of *P. acacia, E. tereticornis* and *O. basilicum* was made in the ratio of 3:4:4, respectively.

Example 2

Obtaining Nano-Emulsions

The combination of dried methanol extracts produced according to Example 1 was then reconstituted separately in methanol and in deionized water containing 1% ethanol at a concentration of 100 mg/mL of the combined dried methanol extracts to obtain a reconstituted suspension. A 10 ml volume of this reconstituted suspension was mixed with a co-surfactant (glycerol; 5 ml), and a surfactant (Tween 80; 5 ml), to generate nano-emulsions (Nano-Es 10%). The resulting mixture was vortexed for about 3 to about 5 minutes, and deionized water was added dropwise over a period of about 10 to about 15 minutes to reach a final volume of 100 ml. This mixture was then sonicated for about 30 minutes in an ultrasonic bath (LC 60 H, Elma). The prepared Nano-Es droplet size was measured using Nano DLS/Particle Size Systems (NICOMP, N3000, Inc., Santa Barbara, Calif, USA). A Zeta Sizer nano (Malvern, UK), model: (Nano ZS, ZEN 3600), was used to determine zeta potential range (–200:200 mV).

Transmission electron microscopy (JEOL JEM 2100, JAPAN) was used to reveal the internal structure with indexing for the diffraction pattern of OB and OV nano-emulsions. Physical stability tests were conducted on both the nano-emulsions prepared according to the methods described above (Nano-E) and on a control sample of the prepared methanolic extract mixture without any emulsifiers (EO control), including a centrifugation test conducted via centrifugation at 2000 rpm during 10, 20, and 30 minutes, and a thermal stability test conducted by storing aliquots of the nano-emulsions at 4±1° C., 25±1° C., and 50±1° C. for 30 days and periodically assessing color, pH, conductivity, and phase changes. The results of the physical stability tests are summarized in Table 9.

phase separation resistance. Accordingly, the Nano-Es formulation is fit for long-term storage and use, as confirmed by the lack of any appreciable deterioration or separation.

With $LD_{50}$ of 4.57 μg/larva and $LC_{50}$ of 247 μg/mL the biopesticide showed a substantial toxic impact against Red Palm Weevil (*R. ferrugineus*).

The biopesticide blocked acetylcholine esterase (AChE), acid phosphatases (ACP), alkaline phosphatases (ALP), and gamma-aminobutyric acid transaminase (GABA-T), among the important enzymes involved in insect metabolism.

The biopesticide nano-emulsion formulation, containing the combined methanolic extracts of *Plicosepalus acaciae,*

TABLE 9

Characterization and Physical Stability of the Formulated Nano-Emulsions of Mixture Extracts

| Type | PH | EC (mmols/ cm) | Separation phase centrifugation @ 2K rpm 10 min | 20 min | 30 min | Separation phase during 30 days 4 ± 2° C. | 25 ± 2° C. | 40 ± 2° C. |
|---|---|---|---|---|---|---|---|---|
| EXTRACT EO | 7.5 ± 0.1 | 0.015 ± 0.1 | — | — | — | — | — | — |
| Nano-E | 6.6 ± 0.11 | 0.128 ± 0.1 | 0.00 | 0.00 | 0.3% | 0.00 | 0.00 | 0.00 |

Example 3

Assaying Secondary Metabolite Production and Activity Against Red Palm Weevil

Further experiments were conducted to ascertain the secondary metabolites produced by the *P. acacia* leaf extracts and the *E. tereticornis* and *O. basilicum* cell suspensions, along with their insecticidal activity and inhibitory action against *R. ferrugineus*. LC-MS was used to ascertain and characterize the growth kinetics when inoculating *V. dahliae.*

In vitro and in vivo assessments of the insecticidal activity of the combined dried methanol extracts of *E. tereticornis* and *O. basilicum* against *R. ferrugineus* (larva and adult) and proteolytic enzyme activity were made. The combination extract has an $LD_{50}$ of 4.57 μg/larva and an $LC_{50}$ of 247 μg/mL. With an $IC_{50}$ (in vitro) of 108.3, 81.2, 96.7, 65.9, and 46.8 μg/mL, the combination extract reduced total protease, trypsin-like serine proteinases, elastase, cysteine, and metalloprotease activity accordingly.

Separately, the *P. acacia* leaf extracts were found to include secondary metabolites that inhibit acetylcholine esterase (AChE), acid phosphatases (ACP), alkaline phosphatases (ALP), and gamma-aminobutyric acid transaminase (GABA-T) enzymes of *R. ferrugineus*. The *P. acacia* leaf extract was efficient against all four enzymes investigated with the $IC_{50}$ of 114.8, 132.7, 142.5, and 192.4 μg/mL for AChE, ACP, ALP, and GABA-T inhibition in vitro and 149.6, 166.2, 171.3, and 227.8 μg/mL for inhibition in vivo. Secondary metabolites were investigated in silico utilizing ADMET assessment methods and molecular dynamics simulations (docking).

Example 4

Biopesticide Efficiency

The biopesticide treatment prepared according to the method of Example 1 was tested on Red Palm Weevil (*Rhynchophorus ferrugineus*).

Under many situations the nano-emulsion (Nano-Es) formulation showed constant pH, electrical conductivity, and

*Eucalyptus tereticornis,* and *Ocimum basilicum* (3:4:4 ratio), lowered proteolytic enzyme activity, thereby affecting insect digestion and growth.

Key bioactive chemicals found to be responsible for *Ocimum basilicum*'s insecticidal qualities were phenolic compounds from *Ocimum basilicum.*

The bioactive phytochemical compounds identified within the biopesticide nano-emulsion formulation also showed promise for biopesticide treatment, therefore suggesting a double advantage from environmental sustainability to insect control.

As shown in the data presented in Example 2 and Example 3, the nano-emulsion biopesticide formulation proved to be a strong substitute for chemical pesticides, exhibiting high insecticidal activity ($LD_{50}$=4.57 μg/larva; $LC_{50}$=247 μg/mL), multi-enzyme inhibition, and excellent physical stability after 30 days of storage. The combination of plant-derived secondary metabolites with nano-emulsion technology improved bioavailability, durability, and potency while maintaining environmental safety.

It is to be understood that the biopesticide formulation including *Plicosepalus acaciae, Ocimum basilicum,* and *Eucalyptus tereticornis* extracts is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:
1. A biopesticide formulation comprising:
a dried extract of *Plicosepalus acaciae;*
a dried extract of *Ocimum basilicum;* and
a dried extract of *Eucalyptus tereticornis,*
wherein the formulation comprises a 3:4:4 ratio of the *Plicosepalus acaciae* dried extract, the *Ocimum basilicum* dried extract, and the *Eucalyptus tereticornis* dried extract.
2. The biopesticide formulation of claim 1, further comprising glycerol and polysorbate 80.

3. The biopesticide formulation of claim 2, wherein the biopesticide formulation is formulated as a nano-emulsion.

4. The biopesticide formulation of claim 1, wherein the biopesticide has an $LD_{50}$ of 4.57 µg/larva and a $LC_{50}$ of 247 µg/mL against *Rhynchophorus ferrugineus*.

5. A method of making the biopesticide formulation of claim 1, the method comprising:

providing *Plicosepalus acaciae* leaves;

drying the *Plicosepalus acaciae* leaves to obtain dried *Plicosepalus acaciae* leaves;

grinding the dried *Plicosepalus acaciae* leaves to obtain *Plicosepalus acaciae* powder;

extracting the *Plicosepalus acaciae* powder using methanol to obtain a first *Plicosepalus acaciae* extract;

concentrating first *Plicosepalus acaciae* extract to obtain a second *Plicosepalus acaciae* extract;

providing *Eucalyptus tereticornis* seeds;

delinting, sterilizing, and germinating the *Eucalyptus tereticornis* seeds;

cutting leaf segments from the germinated *Eucalyptus tereticornis*;

growing the *Eucalyptus tereticornis* leaf segments with a growth medium to obtain *Eucalyptus tereticornis* callus;

extracting the *Eucalyptus tereticornis* callus with methanol to obtain an *Eucalyptus tereticornis* extract;

providing *Ocimum basilicum* seeds;

delinting, sterilizing, and germinating the *Ocimum basilicum* seeds;

cutting leaf segments from the germinated *Ocimum basilicum*;

growing the *Ocimum basilicum* leaf segments with a growth medium to obtain *Ocimum basilicum* callus;

extracting the *Ocimum basilicum* callus with methanol to obtain an *O. basilicum* extract;

drying the second *Plicosepalus acaciae* extract, the *Eucalyptus tereticornis* extract, and the *Ocimum basilicum* extract; and mixing the dried *Plicosepalus acaciae* extract, the dried *Eucalyptus tereticornis* extract, and the dried *Ocimum basilicum* extract to obtain the biopesticide formulation.

6. The method of claim 5, wherein the *Plicosepalus acaciae* leaves are dried by a method selected from the group consisting of sun drying, oven drying, and air drying.

7. The method of claim 5, wherein grinding the *Plicosepalus acaciae* leaves comprises grinding the *Plicosepalus acaciae* leaves using a mortar and pestle.

8. The method of claim 5, wherein concentrating first *Plicosepalus acaciae* extract comprises concentrating the first *Plicosepalus acaciae* extract at about 30° C. to about 45° C. using a rotary evaporator.

9. The method of claim 5, wherein growing the *Eucalyptus tereticornis* leaf segments with a growth medium comprises growing the *Eucalyptus tereticornis* leaf segments on Murashige and Skoog medium.

10. The method of claim 9, wherein the Murashige and Skoog medium comprises about 3% sucrose and about 6.0 g/L of agar.

11. The method of claim 9, wherein the Murashige and Skoog medium comprises about 0.5 mg/L 2,4-dichlorophenoxyacetic acid (2, 4-D), about 0.5 mg/L kinetin, about 0.5 mg/L Naphthaleneacetic Acid, and about 1 mg/L Indole-3-Butyric Acid.

12. The method of claim 9, wherein the Murashige and Skoog medium comprises about 100 mM of methyl jasmonate, about 0.3 mg/L kinetin, about 0.5 mg/L 2,4-D, about 0.2 mg/L Naphthaleneacetic Acid, and about 1 mg/L Indole-3-Butyric Acid, and *Verticillium dahliae*.

13. The method of claim 5, wherein growing the *Ocimum basilicum* leaf segments with a growth medium comprises growing the *Ocimum basilicum* leaf segments on Murashige and Skoog medium.

14. The method of claim 13, wherein the Murashige and Skoog medium comprises about 3% sucrose and about 6.0 g/L of agar.

15. The method of claim 13, wherein the Murashige and Skoog medium comprises about 0.5 mg/L 2,4-D, about 0.5 mg/L kinetin, about 0.5 mg/L Naphthaleneacetic Acid, and about 1 mg/L Indole-3-Butyric Acid.

16. The method of claim 13, wherein the Murashige and Skoog medium comprises about 100 mM of methyl jasmonate, about 0.3 mg/L kinetin, about 0.5 mg/L 2,4-D, about 0.2 mg/L Naphthaleneacetic Acid, and about 1 mg/L Indole-3-Butyric Acid, and *Verticillium dahliae*.

17. The method of claim 5, wherein growing the *Ocimum basilicum* leaf segments with a growth medium comprises growing the *Ocimum basilicum* leaf segments on Linsmaier and Skoog medium, and wherein growing the *Eucalyptus tereticornis* leaf segments with a growth medium comprises growing the *Eucalyptus tereticornis* leaf segments on Linsmaier and Skoog medium.

18. The method of claim 5, comprising:

mixing the biopesticide formulation is with a surfactant and a co-surfactant to obtain a first mixture;

vortexing the first mixture;

adding deionized water to the first mixture to obtain a second mixture;

and sonicating the second mixture to obtain a nano-emulsion comprising the biopesticide formulation.

19. A method of inhibiting or killing *Rhynchophorus ferrugineus*, comprising administering the biopesticide formulation of claim 1 to a plant in need thereof.

* * * * *